United States Patent [19]

Hill et al.

[11] 3,857,693

[45] Dec. 31, 1974

[54] ANILIDE CARBAMATES AS HERBICIDES

[75] Inventors: Kenneth L. Hill, Middleport; Kenneth R. Wilson, Tonawanda, both of N.Y.

[73] Assignee: FMC Corporation, New York, N.Y.

[22] Filed: Sept. 6, 1966

[21] Appl. No.: 577,191

Related U.S. Application Data

[63] Continuation-in-part of Ser. No. 496,159, Oct. 14, 1965, abandoned.

[52] U.S. Cl............... 71/106, 71/88, 71/94, 260/247.2 A, 260/247.2 B, 260/293.77, 260/468 E, 260/479 C
[51] Int. Cl................................. A01n 9/20
[58] Field of Search......... 71/88, 94, 106, 111, 118; 260/479 C

[56] References Cited

UNITED STATES PATENTS

| | | | |
|---|---|---|---|
| 2,776,196 | 1/1957 | Gysin et al. | 260/479 |
| 2,997,499 | 8/1961 | Kaeding | 260/479 |
| 3,037,993 | 6/1962 | Shulgin | 260/479 |
| 3,091,633 | 5/1963 | Strube | 260/479 |
| 3,099,681 | 7/1963 | Kilsheimer et al. | 260/479 |
| 3,110,726 | 11/1963 | Moore et al. | 260/479 |
| 3,125,598 | 3/1964 | Kuhle et al. | 71/111 |
| 3,203,949 | 8/1965 | Hopkins et al. | 71/95 |
| 3,226,426 | 12/1965 | Hopkins et al. | 71/95 |
| 3,308,154 | 3/1967 | Schumann | 260/479 |
| 3,337,608 | 8/1967 | Schumann | 260/479 |
| 3,341,401 | 9/1967 | Kilsheimer et al. | 260/479 |
| 3,362,992 | 1/1968 | Schwartz | 71/118 |
| 3,364,106 | 1/1968 | Kaeding | 260/479 |

FOREIGN PATENTS OR APPLICATIONS

| | | | |
|---|---|---|---|
| 554,576 | 3/1958 | Canada | 260/479 |

OTHER PUBLICATIONS

Gysin et al., "Mittle Zur Beeinflussung des Pflanzenwachstums," German Appl. No. G 15250, (1956).

*Primary Examiner*—Glennon H. Hollrah
*Attorney, Agent, or Firm*—Abner Sheffer; Henry R. Ertelt; Pauline Newman

[57] ABSTRACT

New herbicidal m-amidophenyl-N-substituted carbamates.

31 Claims, No Drawings

ANILIDE CARBAMATES AS HERBICIDES

This application is a continuation-in-part of out copending application Ser. No. 496,159 filed Oct. 14, 1965, now abandoned.

This invention relates to novel herbicidal compounds, to new herbicidal compositions, and to a new method for the control of undesired plant growth, both pre-emergently and post-emergently, by application of said new and useful herbicidal compositions.

The novel herbicidal compounds of this invention are m-amidophenyl N-substituted carbamates of the following structure:

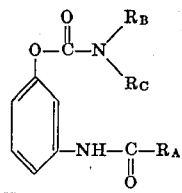

where

is the residue of a primary or secondary amine of the formula

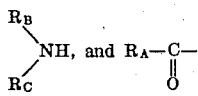

is the residue of a carboxylic acid having at least two carbon atoms of the formula $R_A COOH$. The substituents $R_B$ and $R_C$ may also form a heterocyclic ring with the carbamate nitrogen, e.g. a morpholine or piperidine ring.

In one useful class of compounds, $R_A$ and $R_B$ are each aliphatic radicals, more preferably having up to about six catenated carbon atoms, which aliphatic radicals may be cyclic, straight chain or branched chain, saturated or unsaturated; $R_C$ is preferably hydrogen but may be lower alkyl group (e.g. methyl).

Examples of $R_A$ and $R_B$ aliphatic radicals are methyl, ethyl, propyl, isopropyl, butyl, sec-butyl, isobutyl, tert-butyl, pentyl, neopentyl, isopentyl, 1-methylbutyl, 2-methylbutyl, cyclohexyl, cyclopropyl, cyclopentyl, cyclobutyl, hyxyl, 1-methylpentyl, 1,1-dimethylpropyl, 1,2-dimethylpropyl, 1, 1, 2, 2-tetramethylpropyl, 1,1-dimethylbutyl, 1,1-dimethylpentyl, 1,1,3-trimethylbutyl, 1-ethylbutyl, 1-ethylpentyl, chloroethyl, 3-chloropropyl, 2-chloropropyl, 1-chloro-2-propyl, allyl, 1-methylallyl, 2-butenyl, 3-butenyl, 2-propynyl, 1-methyl-2-propynyl and, particularly for $R_A$, vinyl, propenyl, isopropenyl, 1-butenyl, 1-pentenyl, 1-methyl-1-propenyl, 2-methyl-1-propenyl, 1-methyl-1-butenyl, 1-methyl-1-pentenyl, 1,3-dimethyl-1-butenyl, 1-ethylvinyl, 1-ethyl-1-butenyl, ethynyl, 1-propynyl, 1-butynyl, and 1-chlorobutyl and 1-chloro-1-methylbutyl.

Examples of $R_C$ radicals, other than hydrogen, are methyl, ethyl, isopropyl, propyl and tert-butyl radicals.

In one preferred class of particularly active herbicidal materials $R_C$ is hydrogen and

is the residue of a carboxylic acid in which the alpha carbon atom carries a methyl group. Here $R_A$ may be, for example, ethyl or 1-methyl-butyl (which yield especially active products) or tert-butyl, 1-methylpentyl or 1,1-dimethylbutyl or isopropyl. In another preferred class, said alpha carbon is part of a cyclopropyl ring. In still another preferred class $R_A$ is a 1-propenyl radical.

The novel compounds of this invention may be prepared by methods employed for the synthesis of carbamates and/or amides. For example, N-monosubstituted-carbamic acid esters may be prepared by reacting an appropriate m-amido-phenol with an appropriate isocyanate. This reaction may be catalyzed by materials such as triethylamine, 1,4-diazabicyclo[2.2.2]octane, dibutyltin diacetate, dimethyltin dichloride and dibutylbis (dodecylthio)tin. N,N-Disubstituted- and N-monosubstituted- carbamic acid esters may be prepared by treating the sodium salt of an appropriate m-amidophenol with an N-monosubstituted- or N,N-disubstituted-carbamoyl halide; another name for the 1,4-diazabicyclo [2.2.2] octane is "triethylenediamine".

The intermediate m-amidophenols may be prepared by treatment of m-aminophenol with an acylating agent such as an acyl halide, or an acid anhydride, or an aliphatic acid, to produce a 3'-hydroxyanilide or a 3'-hydroxy-N-substituted-anilide. A suitable acid acceptor is used to remove the acid by-product formed in the reaction with an acyl halide or an acid anhydride, and a suitable drying agent is used to remove the water formed in the reaction with an aliphatic acid.

m-Amidophenyl N-substituted-carbamates may also be prepared by first converting an appropriate m-amidophenol to its chloroformic acid ester by treatment with phosgene, then allowing the chloroformate to react with a primary or secondary amine, including the heterocyclic amines such as piperidine or morpholine.

Another method useful for the preparation of m-amidophenyl N-substituted-carbamates involves the treatment of a m-aminophenyl N-substituted- or N,N-disubstituted-carbamate with an acyl halide or an anhydride, in the presence of a suitable acid acceptor. Similarly, treatment of the appropriate m-aminophenyl carbamate with an aliphatic acid will produce a m-amidophenyl N-substituted- or N,N-disubstituted-carbamate; this reaction may be driven to completion by removal of the volatile by-product or water. The intermediate m-aminophenyl N-substituted-or N,N-disubstituted-carbamates may be obtained by reduction of the corresponding m-nitrophenyl carbamates which, in turn, may be obtained by treatment of m-nitrophenol with an appropriate isocyanate, or with an N-monosubstituted- or N,N-disubstituted-carbamoyl halide. Useful m-nitrophenyl N-substituted-carbamates may also be prepared by conversion of m-nitrophenol to its chloroformic acid ester with phosgene and reaction of the m-nitrophenyl chloroformate with a primary or secondary amine.

Other methods useful for the preparation of m-amidophenyl N-substituted-carbamates include the reaction of a m-amidophenol with an alkyl N-substituted-carbamate or a N-substituted-urea, to yield a m-amidophenyl N-substituted-carbamate and an alcohol or ammonia, as described in U.S. Pat. No. 2,871,259. In these instances the reaction can be driven to completion by removal of the volatile by-product. Similarly, the exchange reaction between an aliphatic acid ester of a m-amidophenol and an alkyl N-substitutedcarbamate yields a m-amidophenyl N-substituted-carbamate and an aliphatic acid ester; again the reaction may be driven to completion by removal of the volatile aliphatic acid ester.

These reactions of amines with acyl halides, acid anhydrides, acids and amides, and of phenols with phosgene, isocyanates, carbamoyl halides, and other reagents described hereinabove are well known in the art. For example, useful procedures for the preparation of carbamic acid esters are described by R. B. Wagner and H. D. Zook, "Synthetic Organic Chemistry", Chp. 23, John Wiley and Sons, Inc., New York, 1953. The acylation of m-aminophenol with acid anhydrides is described by E. Felder and D. Petre, Farmaco (Pavia) Ed. Sci. 15, 609-31(1960).

Obviously the reactants selected will depend on the final product desired, as will the choice of synthetic procedure used. The m-amidophenyl carbamates thus produced are novel compounds, and are characterized by excellent herbicidal properties.

For herbicidal applications, the active m-amidophenyl carbamates as above defined are formulated into herbicidal compositions by admixture, in herbicidally effective amounts, with the adjuvants and carriers normally employed for facilitating the dispersion of active ingredients for agricultural applications, recognizing the fact that the formulation and mode of application of a toxicant may affect the activity of the material in a given application. Thus, these active herbicidal compounds may be formulated as granules of relatively large particle size, as wettable powders, as emulsifiable concentrates, as powdery dusts, as solutions or as any or several other known types of formulations, depending on the desired mode of application. Preferred formulations for both pre- and post-emergence herbicidal applications are wettable powders, emulsifiable concentrates, and granules. These formulations may contain as little as 0.5% to as much as 95% or more by weight of active ingredient.

Wettable powders are in the form of finely divided particles which disperse readily in water or other dispersant. The wettable powder is ultimately applied to the soil or foliage as a dry dust or as a dispersion in water or other liquid. Typical carriers for wettable powders include fuller's earth, kaolin clays, silicas and other readily wet organic or inorganic diluents. Wettable powders normally are prepared to contain about 5-95% of active ingredient by weight and usually also contain a small amount of a wetting, dispersing or emulsifying agent to facilitate wetting and dispersion. For example, a useful wettable powder formulation contains 80.8 parts by weight of the m-amidophenyl carbamate, 17.9 parts by weight of kaolin clay, and 1.0 part by weight of sodium lignosulfonate and 0.3 part by weight of sulfonated aliphatic polyester as wetting agents.

Emulsifiable concentrates are homogeneous liquid compositions which are dispersible in water or other dispersant, and may consist entirely of the m-amidophenyl carbamate with a liquid or solid emulsifying agent, or may also contain a liquid carrier, such as xylene, heavy aromatic naphthas, isophorone and other non-volatile organic solvents. For herbicidal application these concentrates are dispersed in water or other liquid carrier, and are normally applied as a spray to the area to be treated. The percentage by weight of the essential active ingredient may vary according to the manner in which the composition is to be applied, but in general comprises 0.5 to 95% of active ingredient by weight of the herbicidal composition. For example, a useful emulsifiable concentrate formulation contains 11.6 parts by weight of the m-amidophenyl carbamate, 57.7 parts by weight of cresol and 30.7 parts by weight of sulfated ethoxylated nonylphenol.

Granular formulations, wherein the toxicant is carried on relatively coarse particles, are usually applied without dilution to the area in which suppression of vegetation is desired. Typical carriers for granular formulations include sand, fuller's earth, bentonite clays, vermiculite, perlite and other organic or inorganic materials which absorb or which may be coated with the toxicant. Granular formulations normally are prepared to contain about 5-25% of active ingredient and may also contain small amounts of other ingredients which may include surface-active agents such as wetting agents, dispersing agents or emulsifiers; oils such as the heavy aromatic naphthas, kerosene or other petroleum fractions, vegetable oils; and/or stickers such as dextrins, glue or synthetic resins. The average particle size of the granules is usually between 150 and 2400 microns. For example, a useful granular formulation contains 5.05 parts by weight of the m-amidophenyl carbamate, 5.00 parts by weight of corn oil and 89.95 parts by weight of crushed corncobs.

Typical wetting, dispersing or emulsifying agents used in agricultural formulations include, for example, the alkyl and alkylaryl sulfonates and sulfates and their sodium salts; polyhydric alcohols; and other types of surface-active agents, many of which are available in commerce. The surface-active agent, when used, normally comprises from 0.1 to 15% by weight of the herbicidal composition.

Dusts, which are free flowing admixtures of the active ingredient with finely divided solids such as talc, clays, flours, and other organic and inorganic solids which act as dispersants and carriers for the taxicant, are useful formulations for soil-incorporated applications; the finely divided solids have an average particle size of less than about 50 microns.

Pastes, which are homogeneous suspensions of a finely divided solid toxicant in a liquid carrier such as water or oil, are employed for specific purposes. These formulations normally contain about 5-95% of active ingredient by weight, and may also contain small amounts of a wetting, dispersing or emulsifying agent to facilitate dispersion. For application, the pastes are normally diluted and applied as a spray to the area to be affected.

Other useful formulations for herbicidal applications include simple solutions of the active ingredient in a dispersant in which it is completely soluble at the desired concentration, such as acetone, alkylated naphthalenes, xylene or other organic solvents. Pressurized sprays, typically aerosols wherein the active ingredient is dispersed in finely divided form as a result of vaporization of a low boiling dispersant solvent carrier, such as the Freons, may also be used.

The perparation, properties, and herbicidal activity of representative herbicidal compounds of this invention are illustrated further in the following examples, in which all temperatures are in degrees Centigrade.

In the following specific examples, which are given to illustrate this invention further, references will be made to tests of pre-emergence and post-emergence herbicidal activity on various plant species. The plant species used for the tests were chosen as representative of a broad spectrum of types of plants. In carrying out the tests there were used flat pans containing, to a depth of three inches, a 1:1 mixture of siltloam and sandy-loam soils, and the seeds were planted to the depth indicated for the appropriate plant, taken from the following schedule:

| Common Name | Scientific Name | Planting Depth (inches) |
| --- | --- | --- |
| Barnyard grass | Echinochloa crusgalli | ¼ – ½ |
| Carrot | Daucus carota | ¼ – ½ |
| Chickweed | Cerastium vulgatum | ¼ – ½ |
| Corn | Zea mays | 1 |
| Corn cockle | Agrostemma Githago | ¼ – ½ |
| Cotton | Gossypium hirsutum | 1 |
| Crabgrass | Digitaria sanguinalis | ¼ – ½ |
| Cucumber | Cucumis sativus | ¼ – ½ |
| Curly dock | Rumex crispus | ¼ – ½ |
| Flax | Linum usitatissimum | ¼ – ½ |
| German hay millet | Setaria italica | ¼ – ½ |
| Giant foxtail | Setaria magna | ¼ – ½ |
| Lambsquarter | Chenopodium album | ¼ – ½ |
| Lettuce | Lactuca sativa | ¼ – ½ |
| Lima bean | Phaseolus limensis | 1 |
| Meadow fescue | Festuca elatior | ¼ – ½ |
| Mustard | Brassica juncea | ¼ – ½ |
| Oat | Avena sativa | ¼ – ½ |
| Pea | Pisum sativum | 1 |
| Peanut | Arachis hypogaea | 1 |
| Pigweed | Amaranthus retroflexus | ¼ – ½ |
| Rice | Oryza sativa | ¼ – ½ |
| Safflower | Carthamus tinctorius | ¼ – ½ |
| Soybean | Glycine max | 1 |
| Sugar beet | Beta vulgaris | ¼ – ½ |
| Tomato | Lycopersicum esculentum | ¼ – ½ |
| Velvet leaf | Abutilon theophrasti Medic. | ¼ – ½ |
| Yellow foxtail | Setaria glauca | ¼ – ½ |

For the pre-emergence tests, as soon as the seeds were planted and the flats watered, the toxicant was sprayed on the soil as an acetone-water solution at the indicated rate. Both the treated flats and the untreated controls were held in the greenhouse for approximately two weeks, after which time the performance of the toxicant was assessed in terms of percent kill with respect to the untreated controls.

For the post-emergence tests, the flats were watered and the seed allowed to grow in the greenhouse for approximately two weeks. Maintaining untreated controls, the stand of plants was then sprayed with an aqueous acetone solution of the toxicant at the indicated rate. After a period of approximately 2 weeks, the number of surviving plants was observed, and the percent kill with respect to the untreated controls was estimated.

EXAMPLE 1

This example relates to m-(2-methylvaleramido)phenyl methylcarbamate. The intermediate 3'-hydroxy-2-methylvaleranilide was prepared as follows: 2-Methylvaleryl chloride (13.5 g) was added dropwise to a solution of m-aminophenol (21.8 g) in 200 ml of dry acetonitrile, maintaining the temperature at 35°–40°. The mixture was stirred for 2 hours, allowed to stand overnight, and the m-aminophenol hydrochloride removed by filtration. The filtrate was concentrated to dryness under reduced pressure to yield 18 g of 3'-hydroxy-2-methylvaleranilide melting at 137.0°–8.5°. This product can be recrystallized from toluene or aqueous methanol.

Analysis: Calculated for $C_{12}H_{17}NO_2$: C 69.54, H 8.27, N 6.76;
Found: C 69.49, H 8.39, N 6.61.

This product was reacted with methyl isocyanate as follows: To a stirred suspension of 3'-hydroxy-2-methylvaleranilide (18.3 g) in 250 ml of anhydrous ether was added 2 to 3 drops of triethylamine. Methyl isocyanate (7.1 g) was added dropwise, and the reaction mixture was stirred at room temperature overnight. The slurry was then refluxed for 6 hours, cooled and filtered. The solid was washed with ether and dried to yield 13.3 g of m-(2-methylvaleramido)phenyl methylcarbamate melting at 144°–5°. Evaporation of the filtrate gave an additional 7.0 g of crude product.

Analysis: Calculated for $C_{14}H_{20}N_2O_3$: C 63.61, H 7.63, N 10.60;
Found: C 63.59, H 7.40, N 10.47.

On pre-emergence testing at a dosage of eight pounds per acre, this compound showed 100% kill of mustard and flax and severe damage to lettuce, carrots, crabgrass, corn, cotton and lima beans. On post-emergence testing of this compound at a dosage of 8 pounds per acre there was 100% kill of mustard, lettuce, crabgrass, flax, lima beans, carrots and cotton; corn and oats were so heavily damaged that death was expected.

EXAMPLE 2

This example relates to m-propionamidophenyl methylcarbamate. The intermediate m-aminophenyl methylcarbamate was prepared as follows: Methyl isocyanate (57 g) was added dropwise to a stirred solution of m-nitrophenol (125 g) and triethylamine (10 drops) in 750 ml of ether and a solution was refluxed for two hours. The product, which precipitated out on cooling, was collected on a filter and washed thoroughly with ether. The crude m-nitrophenyl methylcarbamate was recrystallized from methanol to yield 67 g of solid melting at 133°–5°. To a solution of m-nitrophenyl methylcarbamate (156.8 g) in 800 ml of ethyl acetate was added 0.8 g of platinum oxide catalyst. The solution was hydrogenated in a Parr hydrogenator. When the theoretical amount of hydrogen had been absorbed, the mixture was filtered to remove the catalyst, and the ethyl acetate was removed under reduced pressure. The residual oil solidified to yield 118 g of yellow solid. The crude m-aminophenyl methylcarbamate was recrystallized from benzene to melt at 92.5°–4.5°.

The product was reacted with propionyl chloride as follows: Propionyl chloride (7.0 g) was added dropwise to a solution of m-aminophenyl methylcarbamate (12.5 g) and triethylamine (7.0 g) in 150 ml of benzene. The mixture was refluxed for 1 hour, cooled and filtered. The solid was washed thoroughly with water to remove the triethylamine hydrochloride. The residual solid was recrystallized from aqueous methanol to yield 6.7 g of m-propionamidophenyl methylcarbamate melting at 156.5°–8.0°.

On pre-emergence testing of this compound at a dosage of 4 pounds per acre, 100% of mustard, German hay millet, crabgrass, chickweed and pigweed were killed. On post-emergence testing at a dosage of 4 pounds per acre, 100% of mustard, chickweed, and pigweed and 90% of the crabgrass were killed; German hay millet and the surviving crabgrass plants were so severely damaged that death appeared likely.

EXAMPLE 3

This example realtes to m-isobutyramidophenyl methylcarbamate. Following the procedure described in Example 2, m-aminophenyl methylcarbamate was reacted with isobutyryl chloride to yield m-isobutyramidophenyl methylcarbamate melting at 162.0°–4.5° on recrystallization from aqueous methanol.

Pre-emergence testing at a dosage of 4 pounds per acre resulted in 100% kill of mustard, chickweed and pigweed, and 90% kill of crabgrass (with the remaining plants severely damaged and expected to die); the large majority of German hay millet was also killed. Post-emergence testing at a dosage of 4 pounds per acre resulted in 100% kill of pigweed, mustard and chickweed, and moderate damage to German hay millet and crabgrass.

EXAMPLE 4

This example relates to m-(2-methylbutyramido)phenyl methylcarbamate. Following the procedure described in Example 2, m-aminophenyl methylcarbamate was reacted with 2-methylbutyryl chloride to yield m-(2-methylbutyramide)phenyl methylcarbamate melting at 161°–3° on recrystallization from aqueous methanol.

Pre-emergence testing at a dosage of 4 pounds per acre resulting in 100% kill of mustard, chickweed and pigweed, and moderate damage to German hay millet and crabgrass. On post-emergence testing a dosage of 4 pounds per acre caused 100% kill of pigweed, and 90% kill of mustard, crabgrass and chickweed, and only slight damage to German hay millet.

EXAMPLE 5

This example relates to m-pivalamidophenyl methylcarbamate. Following the procedure described in Example 2, m-aminophenyl methylcarbamate was reacted with pivaloyl chloride to yield m-pivalamidophenyl methylcarbamate melting at 179.0°–80.5° on recrystallization from aqueous methanol.

On pre-emergence testing of this compound a dosage of 4 pounds per acre killed 100% of mustard, chickweed and pigweed, and caused moderate damage to German hay millet and crabgrass. On post-emergence testing at a dosage of 4 pounds per acre, 100% of pigweed and chickweed, and the majority of mustard and crabgrass were killed, with only slight damage to German hay millet.

EXAMPLE 6

This example relates to m-crotonamidophenyl methylcarbamate. Following the procedure described in Example 2, m-aminophenyl methylcarbamate was reacted with crotonoyl chloride to yield m-crotonamidophenyl methylcarbamate melting at 142.0°–4.5° on recrystallization from aqueous methanol.

Pre-emergence testing at a dosage of 4 pounds per acre resulting in 100% kill of mustard, pigweed and chickweed, 90% kill of crabgrass and 80% kill of German hay millet.

EXAMPLE 7

This example relates to m-(2-methylvaleramido)phenyl ethylcarbamate. Ethyl isocyanate (15 ml) was added dropwise to a stirred mixture of 3'-hydroxy-2-methylvaleranilide (20.7 g) and triethylamine (15 drops). The reaction mixture was stirred at room temperature for 15 minutes, diluted with 100 ml of hexane and filtered. The solid product was recrystallized from aqueous methanol to yield 22.1 g of m-(2-methylvaleramido)phenyl ethylcarbamate melting at 167°–9°.

On pre-emergence testing at a dosage of 4 pounds per acre, 100% of mustard, crabgrass and chickweed were killed, as were 90% of pigweed and 75% of German hay millet. On post-emergence testing at a dosage of 4 pounds per acre, 100% of mustard and chickweed were killed, as were 90% of crabgrass; German hay millet and pigweed were moderately damaged.

EXAMPLE 8

This example relates to m-(2-methylvaleramido)phenyl propylcarbamate. Following the procedure described in Example 7, 3'-hydroxy-2-methylvaleranilide was reacted with propyl isocyanate to yield m-(2-methylvaleramido)phenyl propylcarbamate melting at 164.0°–5.5° on recrystallization from aqueous methanol.

On pre-emergence testing of this compound at a dosage of 4 pounds per acre, 100% of mustard, pigweed and chickweed, 90% of German hay millet and 95% of crabgrass were killed. Post-emergence testing at a dosage of 4 pounds per acre resulted in 100% kill of mustard and chickweed and 50% kill of pigweed and crabgrass, with only slight damage to German hay millet.

EXAMPLE 9

This example relates to m-(2-methylvaleramido)phenyl butylcarbamate. Following the procedure described in Example 7, 3'-hydroxy-2-methylvaleranilide was reacted with butyl isocyanate to yield m-(2-methylvaleramido)phenyl butylcarbamate melting at 154°–6° on recrystallization from aqueous methanol.

Pre-emergence testing of this compound at a dosage of 4 pounds per acre resulted in 100% kill of mustard, chickweed and pigweed, 90% kill of German hay millet and 60% kill of crabgrass. Post-emergence testing at a dosage of 4 pounds per acre caused 100% kill of mustard and chickweed, with little or no damage to German hay millet, crabgrass and pigweed.

EXAMPLE 10

This example relates to m-(2-methylvaleramido)phenyl isopropylcarbamate. Following procedure described in Example 7, 3'-hydroxy-2-methylvaleranilide was reacted with isopropyl isocyanate to yield m-(2-methylvaleramido)phenyl isopropylcarbamate melting at 184°–6° on recrystallization from aqueous methanol.

Pre-emergence testing of this compound at a dosage of 4 pounds per acre resulted in 100% kill of mustard, lettuce, crabgrass, barnyard grass, chickweed and peanuts, and 75% kill of flax, moderate damage to German hay millet, and little or no damage to corn or cotton. Post-emergence testing at a dosage of 3 pounds per acre resulted in a 100% kill of lettuce and 90% kill of chickweed, moderate damage to mustard and little or no damage to German hay millet, barnyard grass and pigweed.

EXAMPLE 11

This example relates to m-(2-chloropropionamido)phenyl methylcarbamate. The intermediate 2-chloro-3'-hydroxypropionanilide (m.p. 157.5°–8.5°) was prepared from m-aminophenol and 2-chloropropionyl chloride following the procedure described in Example 1 for the preparation of 3'-hydroxy-2-methylvaleranilide.

Following the procedure described in Example 7, 2-chloro-3'-hydroxypropionanilide was reacted with methyl isocyanate to yield m-(2-chloropropionamido)phenyl methylcarbamate melting at 169.5°–70.5° on recrystallization from aqueous methanol.

On pre-emergence testing of this compound a 4 pound per acre dosage killed 95% of pigweed and caused moderate damage to mustard, German hay millet, crabgrass and chickweed. Post-emergence testing at a 3 pound per acre dosage resulted in 90% kill of pigweed and 75% kill of lettuce, with little or no damage to mustard, German hay millet, barnyard grass and chickweed.

EXAMPLE 12

This example relates to m-(2,2-dimethylvaleramido)phenyl methylcarbamate. The intermediate 3'-hydroxy-2,2-dimethylvaleranilide was prepared from m-aminophenol and 2,2-dimethylvaleryl chloride following the procedure described in Example 1 for the preparation of 3'-hydroxy-2-methylvaleranilide.

Following the procedure described in Example 7, 3'-hydroxy-2,2-dimethylvaleranilide was reacted with methyl isocyanate to yield m-(2,2-dimethylvaleramido)phenyl methylcarbamate melting at 148.5°–50.5° on recrystallization from aqueous methanol.

Pre-emergence testing of this compound at a dosage of 4 pounds per acre resulted in 100% kill of mustard and pigweed, 95% kill of chickweed, 90% kill of crabgrass and 75% kill of German hay millet. Post-emergence testing of this compound at a dosage of 3 pounds per acre resulted in 100% kill of mustard, lettuce and chickweed, with slight to moderate damage to German hay millet, barnyard grass and pigweed.

EXAMPLE 13

This example relates to m-methacrylamidophenyl methylcarbamate. The intermediate 3'-hydroxymethacrylanilide was prepared as follows: Methacryloyl chloride (15.7 g) was added dropwise to a solution of m-aminophenol (32.7 g) in 150 ml of acetonitrile, maintaining the temperature at 35°–40°. The mixture was stirred for 2 hours, allowed to stand overnight and filtered. The solid was washed thoroughly with water to remove the m-aminophenol hydrochloride, and recrystallized from aqueous methanol to yield 17.5 g of 3'-hydroxymethacrylanilide melting at 178°–80°.

Following the procedure described in Example 7, 3'-hydroxymethacrylanilide was reacted with methyl isocyanate to yield m-methacrylamidophenyl methylcarbamate melting at 179°–82° on recrystallization from methanol.

Pre-emergence testing of this compound at a dosage of 4 pounds per acre resulted in 90% kill of mustard and pigweed, 70% kill of chickweed and 50% kill German hay millet, with moderate damage to crabgrass and the surviving plants of the aforementioned species. Post-emergence testing of this compound at a dosage of 3 pounds per acre resulted in 100% kill of lettuce and slight to moderate damage to mustard, German hay millet, barnyard grass, chickweed and pigweed.

EXAMPLE 14

This example relates to m-(2-methyl-2-pentenamido)phenyl methylcarbamate. The intermediate 3'-hydroxy-2-methyl-2-pentenanilide (crude m.p. 69°–76°) was prepared from m-aminophenol and 2-methyl-2-pentenoyl chloride following the procedure described in Example 1 for the preparation of 3'-hydroxy-2-methylvaleranilide.

Following the procedure described in Example 7, crude 3'-hydroxy-2-methyl-2-pentenanilide was reacted with methyl isocyanate to yield m-(2-methyl-2-pentenamido)phenyl methylcarbamate melting at 166-9° on recrystallization from aqueous methanol.

Pre-emergence testing of this compound at a dosage of 4 pounds per acre resulted in 100% kill of mustard, chickweed, and pigweed, 50% kill of German hay millet and 40% kill of crabgrass with moderate damage to the surviving plants. Postemergence testing of this compound at a dosage of 3 pounds per acre resulted in 100 % kill of mustard, lettuce, chickweed, and pigweed, moderate damage to bannyard grass, but no injury to German hay millet.

EXAMPLE 15

This example relates to m-(2-methylvaleramido)phenyl dimethylcarbamate. To a stirred suspension of sodium hydride (2.7 g) in 100 ml of 1,2-dimethoxyethane, a solution of 3'-hydroxy-2-methylvaleranilide (20.7 g) in 50 ml of 1,2-dimethoxyethane was added dropwise. When the addition was complete and the evolution of hydrogen had ceased, the slurry was stirred at room temperature for one-half hour. Dimethylcarbamoyl chloride (11.9 g) was then added dropwise and the mixture was allowed to stir overnight. The precipitated sodium chloride was removed by filtration and the filtrate was concentrated under reduced pressure to a yellow oil which crystallized on trituration with hexane to melt at 83.5°–6.5°. Recrystallization from benzene-hexane gave 17.5 g of m-(2-methylvaleramido)phenyl dimethylcarbamate, melting at 84.5°–7.0°.

Pre-emergence testing of this compound at a dosage of 4 pounds per acre resulted in 100% kill of mustard, German hay millet and pigweed, and 95% kill of chickweed, and moderate damage to crabgrass. Post-emergence testing of this compound at a dosage of 3 pounds per acre resulted in 100% kill of lettuce and chickweed, and 75% kill of mustard, with little or no damage to German hay millet, barnyard grass and pigweed.

EXAMPLE 16

This example relates to m-(2-methylvaleramido)phenyl tert-butylcarbamate. tert-Butyl isocyanate (5.1 g) was added to a mixture of 3'-hydroxy-2-methylvaleranilide (10.0 g) and triethylamine (5 drops). The reactants were mixed thoroughly by hand, and the flask was stoppered and heated in a water bath at 50° for 2 hours. The crude product was recrystallized from aqueous ethanol to yield 6.2 g of M-(2-methylvaleramido)phenyl tert-butylcarbamate melting at 152°–4°. A second recrystallization from aqueous ethanol raised the melting point to 153°–4°.

Analysis: Calculated for $C_{16}H_{24}N_2O_3$: C 65.72, H 8.27, N 9.58;
Found: C 65.61, H 8.05, N 9.25.

The same product can be obtained using 1,4-diazobicyclo-[2.2.2]octane or dibutyltin diacetate as a catalyst in place of the triethylamine.

Pre-emergence testing of this compound at a dosage of 6 pounds per acre resulted in 100% kill of mustard, lettuce and chickweed, 95% kill of German hay millet and 90% kill of barnyard grass and pigweed. Post-emergence testing of this compound at a dosage of 3 pounds per acre resulted in 100% kill of mustard, lettuce and chickweed and slight to moderate damage to German hay millet, barnyard grass and pigweed.

EXAMPLE 17

This example relates to m-acetamidophenyl methylcarbamate. Following the procedure described in Example 1, a solution of 3'-hydroxyacetanilide in dioxane was reacted with methyl isocyanate in the presence of triethylamine catalyst. The m-acetamidophenyl methylcarbamate melted at 157.0°–8.5° after recrystallization from ethanol.

Post-emergence testing of this compound at a dosage of 8 pounds per acre resulted in 100% kill of lettuce and 50% kill of mustard (with the surviving plants so badly damaged that their death appeared likely), without severe damage to lima beans, corn, cotton, crabgrass, flax, carrots and oats.

EXAMPLE 18

This example relates to m-propionamidophenyl tert-butylcarbamate. The intermediate 3'-hydroxypropionanilide (m.p. 180°–1°) was prepared from m-aminophenol and propionyl chloride following the procedure described in Example 1 for the preparation of 3'-hydroxy-2-methylvaleranilide.

3'-Hydroxypropionanilide (16.5 g) was placed in a flask with triethylenediamine (1.12 g) and treated with 9.9 g of tert-butyl isocyanate. The reaction was stirred well and heated for 2 hours. Recrystallization from ethanol gave 10.4 g of m-propionamidophenyl tert-butylcarbamate melting at 177°–8°.

Analysis: Calc'd for $C_{14}H_{20}N_2O_3$: C 63.61, H 7.63, N 10.60;
Found: C 63.34, H 7.71, N 10.40.

In both pre- and post- emergence testing of this compound, a dosage of 6 pounds per acre resulted in 100% kill of mustard, lettuce, German hay millet, barnyard grass, chickweed and pigweed.

EXAMPLE 19

This example relates to m-propionamidophenyl isopropylcarbamate. Following the procedure described in Example 7, 3'-hydroxypropionanilide was reacted with isopropyl isocyanate and triethylamine to yield m-propionamidophenyl isopropylcarbamate melting at 173.5° on recrystallization from aqueous ethanol.

Pre-emergence testing of this compound at a dosage of 6 pounds per acre resulted in 100% kill of mustard, lettuce, German hay millet, barnyard grass, chickweed and pigweed. In a post-emergence test on mustard, lettuce, German hay millet, crabgrass, flax and chickweed at a dosage of 6 pounds per acre, there was 100% kill of all species.

EXAMPLE 20

This example relates to m-propionamidophenyl isobutylcarbamate. Following the procedure described in Example 18, 3'-hydroxypropionanilide was reacted with isobutyl isocyanate and triethylenediamine to yield m-propionamidophenyl isobutylcarbamate melting at 171.5°–2.5° on recrystallization from ethanol.

Pre-emergence testing of this compound at a dosage of 6 pounds per acre resulted in 100% kill of mustard, 90% and 95% kill of lettuce and flax, respectively, with the remaining plants not expected to live, and moderate damage of crabgrass. Post-emergence testing of this compound at a dosage of 6 pounds per acre resulted in 100% kill of mustard and lettuce, 95% kill of carrots, 60% kill of flax, and moderate control of crabgrass.

EXAMPLE 21

This example relates to m-propionamidophenyl sec-butylcarbamate. Following the procedure described in Example 18, 3'-hydroxypropionanilide was reacted with sec-butyl isocyanate and triethylenediamine to yield m-propionamidophenyl sec-butylcarbamate melting at 174°–6° on recrystallization from ethanol.

Pre-emergence testing of this compound at a dosage of 6 pounds per acre resulted in 100% kill of mustard and flax, 90% kill of lettuce with severe injury to the surviving plants, and 95% kill of crabgrass with the remaining plants not expected to survive. Post-emergence testing of this compound at a dosage of 6 pounds per acre resulted in 100% kill of mustard, flax, carrots and lettuce, and 95% kill of crabgrass with moderate injury to the surviving plants.

EXAMPLE 22

The example relates to m-(propionamido)phenyl allylcarbamate. Following the procedure described in Example 7, 3'-hydroxypropionanilide was reacted with allyl isocyanate and triethylamine to yield m-(propionamido)phenyl allylcarbamate melting at 145°–6° on recrystallization from aqueous ethanol.

Pre-emergence testing of this compound at a dosage of 6 pounds per acre resulted in 100% kill of mustard, German hay millet, flax, carrots and crabgrass, and 95% kill of lettuce with severe injury to surviving plants. Post-emergence testing of this compound at a dosage of 6 pounds per acre resulted in 100% kill of mustard, lettuce, German hay millet, flax, carrots, and crabgrass.

EXAMPLE 23

The example relates to m-propionamidophenyl (2-chloroethyl)-carbamate. Following the procedure described in Example 7, 3'-hydroxypropionanilide was reacted with 2-chloroethyl isocyanate and triethylamine to yield m-propionamidophenyl (2-chloroethyl) carbamate melting at 165°–6° on recrystallization from ethanol.

Pre-emergence testing of this compound at a dosage of 6 pounds per acre resulted in 100% kill of mustard and lettuce, 95% kill of flax, 80% kill of barnyard grass, 70% kill of German hay millet, and 60% kill of crabgrass. In all cases of partial kill, the surviving plants were severely injured. Post-emergence testing of this compound at a dosage of 6 pounds per acre resulted in 100% kill of mustard, lettuce, crabgrass, German hay millet, flax and barnyard grass.

EXAMPLE 24

This example relates to m-propionamidophenyl cyclohexylcarbamate. Following the procedure described in Example 18, 3'-hydroxypropionanilide was reacted with cyclohexyl isocyanate anad triethylenediamine to yield m-propionamidophenyl cyclohexylcarbamate melting at 181°–2.5° on recrystallization from ethanol.

Pre-emergence testing of this compound at a dosage of 6 pounds per acre gave the following results: 100% kill of mustard, 95% kill of lettuce with severe injury to the surviving plants, moderate damage to flax, barnyard grass and crabgrass and only slight damage to German hay millet. Post-emergence testing of this compound at a dosage of 6 pounds per acre resulted in 100% kill of mustard and lettuce, 95% kill of flax with remaining plants expected to die, and little or no effect on crabgrass and German hay millet.

EXAMPLE 25

This example relates to m-propionamidophenyl N,N-dimethylcarbamate. The intermediate sodium salt of 3'-hydroxypropionanilide was prepared by reacting 3'-hydroxypropionanilide (165 g) with methanolic sodium methoxide (obtained by dissolving sodium metal (23 g) in 1800 ml methanol). The solution was stirred for 1 hour at room temperature. Evaporation of the methanol left a sticky solid which was washed twice with benzene. Evaporation of the benzene left 123.4 g of the desired intermediate melting at 67°–9°.

Dimethylcarbamoyl chloride (10.8 g, 0.1 mole) was added dropwise to a slurry of the sodium salt of 3'-hydroxypropionanilide (18.7 g, 0.1 mole) in 150 ml of acetonitrile. The mixture was stirred for 12 hrs, then filtered to recover 5.1 g (87%) of sodium chloride. The solvent was removed from the filtrate in vacuo to give 21.7 g of a dark oil which crystallized on standing, m.p. 90°–5°. Recrystallization from ethanol-water gave a white solid, m.p. 99°–100°.

Analysis: Calc'd for $C_{12}H_{16}N_2O_3$: C 61.00, H 6.83, N 11.86;
Found: C 60.87, H 6.71, N 11.96.

Pre-emergence testing of this compound at a dosage of 6 pounds per acre resulted in 100% kill of mustard and flax, 95% kill of lettuce with severe damage to the surviving plants, 90% kill of German hay millet with severe damage to the surviving plants and severe damage to barnyard grass and crabgrass. Post-emergence testing of this compound at a dosage of 6 pounds per acre resulted in 100% kill of mustard, lettuce, crabgrass, flax and German hay millet, and 95% kill of barnyard grass with the remaining plants not expected to survive.

EXAMPLE 26

This example relates to m-propionamidophenyl ethylcarbamate. Following the procedure described in Example 7, 3'-hydroxypropionanilide was reacted with ethyl isocyanate and triethylamine to yield m-propionamidophenyl ethylcarbamate melting at 168°–9° on recrystallization from aqueous ethanol.

Pre-emergence testing of this compound at a dosage of 6 pounds per acre resulted in 100% kill of mustard, crabgrass, flax, German hay millet and barnyard grass, and 95% kill of lettuce with severe injury to surviving plants. Post-emergence testing of this compound at a dosage of 6 pounds per acre resulted in 100% kill of mustard, lettuce, crabgrass, flax, barnyard grass and German hay millet.

EXAMPLE 27

This example relates to m-propionamidophenyl propylcarbamate. Following the procedure described in Example 7, 3'-hydroxypropionanilide was reacted with propyl isocyanate and triethylamine to yield m-propionamidophenyl propylcarbamate melting at 157°–8° on recrystallization from ethanol.

Pre-emergence testing of this compound at a dosage of 6 pounds per acre resulted in 100% kill of mustard, lettuce, flax and German hay millet, and 90% kill of crabgrass and barnyard grass with severe injury to the surviving plants. Post-emergence testing of this compound at a dosage of 6 pounds per acre resulted in 100% kill of mustard, lettuce, crabgrass, barnyard grass, flax and German hay millet.

EXAMPLE 28

This example relates to m-propionamidophenyl hexylcarbamate. Following the procedure described in Example 7, 3'-hydroxypropionanilide was reacted with hexyl isocyanate and triethylamine to yield m-propionamidophenyl hexylcarbamate melting at 140.0°–0.5° on recrystallization from ethanol.

Pre-emergence testing of this compound at a dosage of 6 pounds per acre resulted in 100% kill of mustard and 95% kill of lettuce with the remaining plants not expected to survive, while German hay millet, crabgrass, barnyard grass and flax were undamaged. Post-emergence testing of this compound at a dosage of 6 pounds per acre resulted in 100% kill of mustard and lettuce with little or no damage to flax, German hay millet, crabgrass and barnyard grass.

EXAMPLE 29

This example relates to m-propionamidophenyl 1,1,-3,3-tetramethylbutylcarbamate. Following the procedure of Example 18, 3'-hydroxypropionanilide was reacted with 1,1,3,3-tetramethylbutyl isocyanate and triethylenediamine to yield m-propionamidophenyl 1,1,3-,3-tetramethylbutylcarbamate melting at 135°–6° on recrystallization from aqueous ethanol.

Pre-emergence and post-emergence testing of this compound at a dosage of 6 pounds per acre resulted in 100% kill of mustard, lettuce and flax, while German hay millet, crabgrass and barnyard grass were undamaged.

EXAMPLE 30

This example relates to m-propionamidophenyl diisopropylcarbamate. The intermediate sodium salt of 3'-hydroxypropionanilide was prepared in the manner described in Example 25. Following the procedure used in the same example, this sodium salt was reacted with diisopropyl carbamoyl chloride to yield m-propionamidophenyl diisopropylcarbamate melting at 125.5°–7.0° on recrystallization from aqueous methanol.

Pre-emergence testing of this compound at a dosage of 6 pounds per acre resulted in 100% kill of mustard, lettuce, flax and German hay millet, 90% kill of crabgrass with moderate damage to the surviving plants and moderate control of barnyard grass. Post-emergence testing of this compound at a dosage of 6 pounds per acre resulted in 100% kill of mustard and lettuce, 80% kill of crabgrass with moderate damage to the surviving plants and moderate control of German hay millet.

EXAMPLE 31

This example relates to m-propionamidophenyl diethylcarbamate. Following the procedure of Example 25 the sodium salt of 3'-hydroxypropionanilide was reacted with diethyl carbamoyl chloride to yield m-propionamidophenyl diethylcarbamate melting at 85.6° on recrystallization from aqueous ethanol.

Pre-emergence testing with this compound at a dosage of 6 pounds per acre resulted in 100% kill of mustard, barnyard grass, flax and German hay millet, 90% kill of lettuce with moderate injury to the surviving plants, and 80% kill of crabgrass with moderate injury to the surviving plants. Post-emergence testing of this compound at a dosage of 6 pounds per acre resulted in 100% kill of mustard, lettuce, crabgrass, barnyard grass, flax and German hay millet.

EXAMPLE 32

This example relates to m-isobutyramidophenyl isopropylcarbamate. The intermediate 3'-hydroxyisobutyranilide (m.p. 180°–1°) was prepared from m-aminophenol and isobutyl chloride following the procedure described in Example 1 for the preparation of 3'-hydroxy-2-methylvaleranilide. Following the procedure described in Example 7, 3'-hydroxyisobutyranilide was reacted with isopropyl isocyanate and triethylamine to yield m-isobutyramidophenyl isopropylcarbamate melting at 179°–180° on recrystallization from ethanol.

Pre-emergence testing of this compound at a dosage of 6 pounds per acre resulted in 100% kill of lettuce, 90% kill of mustard and 95% kill of chickweed with moderate injury to the remaining plants in both cases, 50% kill of pigweed, and moderate damage to German hay millet and barnyard grass. Post-emergence testing of this compound at a dosage of 6 pounds per acre resulted in 50% kill of lettuce with moderate injury to surviving plants and moderate injury to mustard, barnyard grass, chickweed and pigweed, with slight damage to German hay millet.

EXAMPLE 33

The example relates to m-isobutyramidophenyl tert-butylcarbamate. 3'-Hydroxyisobutyranilide (17.9 g) was mixed well with 1.12 g of triethylenediamine and tert-butyl isocyanate (9.9 g) was added cautiously with stirring. The reaction was heated at 50°–60° for 2 hours. Recrystallization of the mixture from ethanol gave 8.5 g of m-isobutyramidophenyl tert-butylcarbamate melting at 178°–9°.

Analysis: Calc'd for $C_{15}H_{22}N_2O_3$: C 64.72, H 7.97, N 10.07;

Found: C 64.83, H 7.70, N 9.83.

Pre-emergence testing of this compound at a dosage of 6 pounds per acre resulted in 100% kill of mustard, lettuce, chickweed and pigweed, 70% kill of barnyard grass and moderate damage to German hay millet. Post-emergence testing of this compound at a dosage of 6 pounds per acre resulted in 100% kill of chickweed, 95 and 75% kill of mustard and lettuce, respectively, with the remaining plants expected to die, and moderate damage to barnyard grass and pigweed.

EXAMPLE 34

The example relates to m-crotonamidophenyl isopropylcarbamate. The intermediate 3'-hydroxycrotonanilide (m.p. 163°–4°) was prepared from m-aminophenol and crotonyl chloride following the procedure described in Example 1 for the preparation of 3'-hydroxy-2-methylvaleranilide. Following the procedure described in Example 18, 3'-hydroxycrotonanilide was reacted with isopropyl isocyanate and triethylamine to yield m-crotonamidophenyl isopropylcarbamate which melted at 173°–4° on recrystallization from aqueous ethanol.

Pre-emergence testing of this compound at a dosage of 6 pounds per acre resulted in 100% kill of mustard, lettuce, and chickweed, 95% kill of German hay millet, with remaining plants expected to die, moderate damage to barnyard grass and slight damage to pigweed. Post-emergence testing of this compound at a dosage of 8 pounds per acre resulted in 100% kill of mustard, lettuce, crabgrass, corn and lima beans.

EXAMPLE 35

This example relates to m-crotonamidophenyl tert-butylcarbamate. Following the procedure described in Example 18, 3'-hydroxycrotonanilide was reacted with tert-butyl isocyanate and triethylenediamine to yield m-crotonamidophenyl tert-butylcarbamate melting at 207°–8° on recrystallization from aqueous ethanol.

Pre-emergence testing of this compound at a dosage of 6 pounds per acre resulted in 100% kill of mustard, lettuce, chickweed and pigweed, 95% kill of German hay millet with moderate damage to surviving plants, and 80% kill of barnyard grass with moderate injury to surviving plants. Post-emergence testing of this compound at a dosage of 6 pounds per acre resulted in 100% kill of mustard, lettuce, German hay millet and chickweed, and 95% kill of crabgrass with moderate injury to the remaining plants, and moderate damage to flax.

EXAMPLE 36

This example relates to m-crotonamidophenyl ethylcarbamate. Following the procedure described in Example 7, 3'-hydroxycrotonanilide was reacted with ethyl isocyanate and triethylamine to yield m-crotonamidophenyl ethylcarbamate melting at 147°–8° on recrystallization from aqueous ethanol.

Pre-emergence testing of this compound at a dosage of 6 pounds per acre resulted in 100% kill of mustard, lettuce, flax and German hay millet, 90% kill of crabgrass with severe injury to the surviving plants, and 80% kill of barnyard grass with the remaining plants not expected to live. Post-emergence testing of this compound at a dosage of 6 pounds per acre resulted in 100% kill of mustard, flax and lettuce, 90% kill of barnyard grass with the remaining plants not expected to live, 80% kill of German hay millet with the remaining plants not expected to live and 50% kill of crabgrass with moderate damage to surviving plants.

EXAMPLE 37

This example relates to m-crotonamidophenyl propylcarbamate. Following the procedure described in Example 7, 3'-hydroxycrotonanilide was reacted with propyl isocyanate and triethylamine to yield m-crotonamidophenyl propylcarbamate melting at 167°–8° on recrystallization from ethanol.

Pre-emergence testing of this compound at a dosage of 6 pounds per acre resulted in 100% kill of mustard, crabgrass, lettuce and flax, 70% kill of German hay millet with moderate damage to surviving plants and moderate damage to barnyard grass. Post-emergence testing of this compound at a dosage of 6 pounds per acre resulted in 100% kill of mustard and lettuce, 75% kill of German hay millet with moderate damage to surviving plants, 50% kill of crabgrass with moderate damage to surviving plants, slight control of barnyard grass and 80% kill of flax with the remaining plants expected to die.

EXAMPLE 38

This example relates to m-crotonamidophenyl allylcarbamate. Following the procedure described in Example 7, 3'-hydroxycrotonanilide was reacted with allyl isocyanate and triethylamine to yield m-crotonamidophenyl allylcarbamate melting at 150°-1° on recrystallization from ethanol.

Pre-emergence testing of this compound at a dosage of 6 pounds per acre resulted in 100% kill of mustard, lettuce and flax, 90% kill of crabgrass with severe injury to surviving plants, 90% kill of German hay millet with the remaining plants expected to die, 70% kill of barnyard grass with moderate injury to surviving plants. Post-emergence testing of this compound at a dosage of 6 pounds per acre resulted in 100% kill of mustard, lettuce and barnyard grass, 75% kill of German hay millet with remaining plants not expected to live, 60% kill of crabgrass with moderate damage to the surviving plants, and 60% kill of flax with the remaining plants expected to die.

EXAMPLE 39

This example relates to m-crotonamidophenyl sec-butylcarbamate. Following the procedure described in Example 18, 3'-hydroxycrotonanilide was reacted with sec-butyl isocyanate and triethylenediamine to yield m-crotonamidophenyl sec-butylcarbamate melting at 198°-9° on recrystallization from ethanol.

Pre-emergence testing of this compound at a dosage of 6 pounds per acre resulted in 100% kill of mustard and flax, 95% kill of lettuce with severe injury to the surviving plants, 90% kill of crabgrass with moderate injury to the surviving plants, 80% kill of German hay millet with moderate damage to the surviving plants and moderate damage to barnyard grass. Post-emergence testing of this compound at a dosage of 6 pounds per acre resulted in 100% kill of mustard, lettuce and flax, 80% kill of German hay millet with the remaining plants not expected to live, and moderate control of crabgrass.

EXAMPLE 40

This example relates to m-crotonamidophenyl dimethylcarbamate. A mixture of triethylamine (7.3 g), 125 ml of benzene and m-aminophenyl dimethylcarbamate (13.0 g) was treated cautiously with crotonyl chloride (7.5 g) maintaining the temperature at ca 60°. The reaction was stirred at 60° for 3 hours, cooled and filtered. The filtrate was chilled to 60°C, washed with cold 5% HCl and water, then dried over MgSO$_4$. The dried benzene solution was treated twice with activated charcoal, the benzene removed by evaporation and the crude oil recrystallized from water to yield m-crotonamidophenyl dimethylcarbamate melting at 90°-1°.

Analysis: Calc'd for $C_{13}H_{16}N_2O_3$: C 62.80, H 6.50, N 11.28;
Found: C 63.01, H 6.57, N 11.19.

Pre-emergence testing of this compound at a dosage of 6 pounds per acre resulted in 50% kill of lettuce with moderate damage to surviving plants and moderate control of mustard, crabgrass and German hay millet with little effect on barnyard grass. Post-emergence testing of this compound at a dosage of 6 pounds per acre resulted in 100% kill of mustard, 60% kill of lettuce with moderate damage to the surviving plants and slight control of crabgrass, with little effect on German hay millet and barnyard grass.

EXAMPLE 41

This example relates to m-butyramidophenyl methylcarbamate. The intermediate 3'-hydroxybutyranilide (m.p. 136°-6.5°) was prepared from m-aminophenol and butyryl chloride following the procedure described in Example 1 for the preparation of 3'-hydroxy-2-methylvaleranilide. Following the procedure described in Example 7, 3'-hydroxybutyranilide was reacted with methyl isocyanate and triethylamine to yield m-butyramidophenyl methylcarbamate melting at 148°-9° on recrystallization from ethanol.

Pre-emergence testing of this compound at a dosage of 6 pounds per acre resulted in 100% kill of mustard, lettuce, chickweed and pigweed and 40% kill of German hay millet with moderate damage to the surviving plants. Post-emergence testing of this compound at a dosage of 6 pounds per acre resulted in 100% kill of mustard, lettuce and chickweed, 90% kill of pigweed with moderate injury to surviving plants and some kill of German hay millet and barnyard grass.

EXAMPLE 42

This example relates to m-valeramidophenyl methylcarbamate. The intermediate 3'-hydroxyvaleranilide (m.p. 115°-6°) was prepared from m-aminophenol and valeryl chloride following the procedure described in Example 1 for the preparation of 3'-hydroxy-2-methylvaleranilide. Following the procedure described in Example 7, 3'-hydroxyvaleranilide was reacted with methyl isocyanate and triethylamine to yield m-(valeramido)phenyl methylcarbamate melting at 140°-1° on recrystallization from ethanol.

Pre-emergence testing of this compound at a dosage of 6 pounds per acre resulted in 100% kill of mustard and chickweed and 95% kill of lettuce with moderate damage to the surviving plants; German hay millet and barnyard grass were unaffected and pigweed was only slightly affected. Post-emergence testing of this compound at a dosage of 6 pounds per acre resulted in 95% kill of chickweed and 90% kill of mustard with moderate damage to the surviving plants in both cases; German hay millet, barnyard grass and pigweed were unaffected and lettuce was only slightly affected.

EXAMPLE 43

This example relates to m-hexanamidophenyl methylcarbamate. The intermediate 3'-hydroxyhexanilide (m.p. 135°-6°) was prepared from m-aminophenol and hexanoyl chloride following the procedure described in Example 1 for the preparation of 3'-hydroxy-2-methylvaleranilide. Following the procedure described in Example 7, 3'-hydroxyhexanilide was reacted with methyl isocyanate and triethylamine to yield m-hexanamidophenyl methylcarbamate melting at 138°-9° on recrystallization from aqueous ethanol.

Pre-emergence testing of this compound at a dosage of 6 pounds per acre resulted in 90% kill of mustard and chickweed with moderate injury to surviving plants, while lettuce and pigweed were only slightly affected and German hay millet and barnyard grass were unaffected. Post-emergence testing of this compound at a dosage of 6 pounds per acre resulted in 100% kill of mustard and 80% kill of chickweed with moderate damage to the surviving plants, while lettuce, German hay millet, crabgrass and pigweed were unaffected.

EXAMPLE 44

This example relates to m-(2,2-dimethylbutyramido)-phenyl methylcarbamate. The intermediate 3'-hydroxy-2,2-dimethylbutyranilide (m.p. 94°–4.5°) was prepared from m-aminophenol and 2,2-dimethylbutyryl chloride following the procedure described in Example 1 for the preparation of 3'-hydroxy-2-methylvaleranilide. Following the procedure described in Example 7, 3'-hydroxy-2,2-dimethylbutyranilide was reacted with methyl isocyanate and triethylamine to yield m-(2,2-dimethylbutyramido)phenyl methylcarbamate melting at 150°–1° on recrystallization from aqueous ethanol.

Pre-emergence testing of this compound at a dosage of 6 pounds per acre resulted in 100% kill of mustard and chickweed and 95% kill of lettuce with the surviving plants not expected to live, and 75% kill of pigweed with moderate damage to the surviving plants; German hay millet was moderately damaged and barnyard grass was only slightly damaged. Post-emergence testing of this compound at a dosage of 6 pounds per acre resulted in 75% kill of mustard and lettuce with moderate injury to the surviving plants and 50% kill of pigweed with moderate damage to surviving plants and moderate control of chickweed, while barnyard grass was unaffected.

EXAMPLE 45

This example relates to m-(2-methylcrotonamido)phenyl methylcarbamate. The intermediate 3'-hydroxy-2-methyl-crotonanilide (m.p. 158.5°–9°) was prepared following the procedure described in Example 1 for the preparation of 3'-hydroxy-2-methylvaleranilide. Following the procedure described in Example 18, 3'-hydroxy-2-methylcrotonanilide was reacted with methyl isocyanate and triethylamine to yield m-(2-methylcrotonamido)phenyl methylcarbamate which melted at 155°–6.5° on recrystallization from aqueous ethanol.

Pre-emergence testing of this compound at a dosage of 6 pounds per acre resulted in 100% kill of mustard, lettuce and chickweed, 80% and 95% kill of German hay millet and barnyard grass, respectively, with moderate damage to the surviving plants as well as moderate control of pigweed. Post-emergence testing of this compound at a dosage of 6 pounds per acre resulted in 100% kill of mustard and chickweed, 80% and 75% kill of barnyard grass and lettuce, respectively, with moderate damage to surviving plants and moderate control of pigweed.

EXAMPLE 46

This example relates to m-(2-chloro-2-methylvaleramido)-phenyl methylcarbamate. The intermediate phenol was prepared as follows: 65.5 g of m-aminophenol was dissolved in 400 ml acetonitrile at 40°. To this solution was added dropwise 50.7 g of 2-chloro-2-methylvaleroyl chloride while the temperature was maintained below 55°. The mixture was poured into two liters of crushed ice. The oil which separated was washed with 10% sodium bicarbonate solution, 10% hydrochloric acid and finally with water. The washed oil was dissolved in hot hexane, the solution treated 3 times with activated charcoal and the hexane removed under reduced pressure to leave 2-chloro-3'-hydroxy-2-methylvaleranilide, which did not crystallize. Following the procedure described in Example 7, 2-chloro-3'-hydroxy-2-methylvaleranilide was reacted with methyl isocyanate and triethylamine to yield m-(2-chloro-2-methylvaleramido)phenyl methylcarbamate which melted at 145°–6° when recrystallized from ethanol.

Analysis: Calc'd for $C_{14}H_{19}ClN_2O_3$: C 56.57, H 6.44, N 9.41, Cl 11.94

Found: C 56.43, H 6.40, N 9.26, Cl 11.79

Pre-emergence testing of this compound at a dosage of 6 pounds per acre resulted in 100% kill of mustard and chickweed, 90% kill of pigweed with moderate damage to the surviving plants, 80% kill of lettuce with severe injury to surviving plants, 75% kill of German hay millet with moderate damage to surviving plants, and moderate damage to barnyard grass. Post-emergence testing of this compound at a dosage of 6 pounds per acre resulted in 100% kill of mustard and lettuce, and slight to moderate damage to German hay millet and pigweed.

EXAMPLE 47

This example relates to m-(2-methylvaleramido)phenyl isobutylcarbamate. The intermediate 3'-hydroxy-2-methyl-valeranilide (137.0°–8.5°) was prepared from m-aminophenol and 2-methylvaleryl chloride following the procedure described in Example 1 for the preparation of this same intermediate. Following the procedure described in Example 18, 3'-hydroxy-2-methylvaleranilide was reacted with isobutyl isocyanate and triethylenediamine to yield m-(2-methylvaleramido)phenyl isobutylcarbamate melting at 156°–7° on recrystallization from aqueous ethanol.

Pre-emergence testing of this compound at a dosage of 6 pounds per acre resulted in 100% kill of mustard, lettuce and chickweed, 95% kill of pigweed, 80% kill of barnyard grass and 60% kill of German hay millet. Post-emergence testing of this compound at a dosage of 6 pounds per acre resulted in 100% kill of mustard, 95% kill of lettuce with surviving plants not expected to live, 50% kill of chickweed with slight injury to the surviving plants and moderate control of German hay millet; flax was slightly damaged and crabgrass was unaffected.

EXAMPLE 48

This example relates to m-(2-methylvaleramido)phenyl allylcarbamate. Following the procedure described in Example 7, 3'-hydroxy-2-methylvaleranilide was reacted with allyl isocyanate and triethylamine to yield m-(2-methylvaleramido)phenyl allylcarbamate melting at 149.0°–9.5° on recrystallization from aqueous ethanol.

Pre-emergence testing of this compound at a dosage of 6 pounds per acre resulted in a 100% kill of mustard, lettuce, German hay millet and flax, 95% kill of crabgrass with moderate injury to the surviving plants and moderate control of barnyard grass. Post-emergence testing of this compound at a dosage of 6 pounds per acre resulted in 100% kill of mustard and lettuce and 90% kill of barnyard grass and flax with the remaining plants not expected to survive; German hay millet and crabgrass were moderately damaged.

EXAMPLE 49

This example relates to m-(2-methylvaleramido)phenyl diisopropylcarbamate. Diisopropylcarbamoyl chloride (16.4 g) was added dropwise to a slurry of the sodium salt of 3'-hydroxyvaleranilide (22.9 g) prepared by the method of Example 25, in 250 ml of acetonitrile. The mixture was stirred for 21 hours and filtered to recover 5.2 g of sodium chloride. The solvent was removed from the filtrate in vacuo to give 23.4 g of a light yellow oil, confirmed by analysis to be m-(2-methylvaleramido)phenyl diisopropylcarbamate b.p. 133° at 5 × 105mm. Hg. Analysis: Calc'd for $C_{19}H_{30}N_2O_3$: C 68.23, H 9.04, N 8.38

Found: C 68.36, H 8.94, N 8.20.

Pre-emergence testing of this compound at a dosage of 6 pounds per acre resulted in 100% kill of mustard, 90% kill of lettuce and German hay millet with moderate damage to the surviving plants, 95% kill of crabgrass with the remaining plants not expected to live and 80% kill of flax with moderate damage to surviving plants; barnyard grass was only slightly affected. Post-emergence testing of this compound at a dosage of 6 pounds per acre resulted in 90% kill of mustard with the remaining plants not expected to survive, 75% kill of lettuce with moderate damage to the surviving plants and moderate damage to flax; German hay millet, crabgrass and barnyard grass were unaffected.

EXAMPLE 50

This example relates to m-[2-cyclopropylacetamido]phenyl tert-butylcarbamate. A mixture of 3'-hydroxy-2-cyclopropylacetanilide (10.7 g), triethylamine (9 g) and tert-butyl isocyanate (6 g) in 50 ml of dimethylformamide was heated at 70° for 24 hours. The solution was cooled to room temperature, filtered and poured into 400 ml of cold water. The solid which separated was isolated and found identical to that separated initially. Recrystallization of the combined solids from aqueous ethanol gave 8.6 g of m-[2-cyclopropylacetamido]phenyl tert-butylcarbamate, m.p. 213.0°–213.5°.

Analysis: Calc'd for $C_{15}H_{20}N_2O_3$: C 65.19, H 7.30, N 10.14

Found: C 65.15, H 7.06, N 10.19.

Both pre-emergence and post-emergence testing of this compound at a dosage of 6 pounds per acre resulted in 100% kill of mustard, lettuce, crabgrass, barnyard grass, German hay millet and flax.

EXAMPLE 51

This example relates to m-(2-methylvaleramido)phenyl sec-butylcarbamate. Following the procedure described in Example 18, 3'-hydroxy-2-methylvaleranilide was reacted with sec-butylcarbamate melting at 172°–4° on recrystallization from ethanol.

Pre-emergence testing of this compound at a dosage of 6 pounds per acre resulted in 100% kill of mustard, 70% kill of flax, and moderate control of lettuce and crabgrass. Post-emergence testing of this compound at a dosage of 6 pounds per acre resulted in moderate control of mustard and crabgrass, 50% kill of flax and slight damage to carrots.

EXAMPLE 52

This example relates to m-(2-chlorovaleramido)phenyl methylcarbamate. The intermediate 2-chloro-3'-hydroxyvaleranilide, m.p. 120.0°–121.5°, was prepared from m-aminophenol and 2-chlorovaleroyl chloride by the procedure described in Example 1 for the preparation of 3'-hydroxy-2-methylvaleranilide.

Analysis: Calc'd for $C_{11}H_{14}ClNO_2$: C 58.02, H 6.16, N 6.15, Cl 15.62

Found: C 58.37, H 6.34, N 6.18, Cl 14.19

Following the procedure of Example 7, 2-chloro-3'-hydroxyvaleranilide was reacted with methyl isocyanate to yield m-(2-chlorovaleramido)phenyl methylcarbamate, which melted at 143.0°–144.5° on recrystallization from aqueous ethanol.

Analysis: Calc'd for $C_{13}H_{17}ClN_2O_3$: C 54.83, H 6.01, N 9.83

Found: C 54.62, H 5.74, N 9.62

Pre-emergence testing of this compound at a dosage of 6 pounds per acre resulted in 100% kill of mustard, lettuce, crabgrass and chickweed and 90 and 60% kill of flat and German hay millet, respectively, with moderate damage to the surviving plants. Post-emergence testing of this compound at 6 pounds per acre resulted in 100% kill of lettuce and crabgrass, 95% kill of mustard with moderate injury to surviving plants, 95% kill of German hay millet with the remaining plants expected to die, 70% kill of chickweed, and 80% kill of flax.

EXAMPLE 53

This example relates to m-(2,2-dimethylvaleramido)phenyl isopropylcarbamate. The intermediate 3'-hydroxy-2,2-dimethylvaleranilide was prepared from m-aminophenol and 2,2-dimethylvaleryl chloride following the procedure described in Example 46. Again the oil did not crystallize.

Analysis: Calc'd for $C_{13}H_{19}NO_2$: C 70.55, H 8.65;

Found: C 70.85, H 8.56.

Following the procedure described in Example 7, the intermediate was reacted with isopropyl isocyanate and triethylenediamine to yield m-(2,2-dimethylvaleramido)phenyl isopropylcarbamate melting at 140°–1° on recrystallization from aqueous ethanol.

Analysis: Calc'd for $C_{17}H_{26}N_2O_3$: C 66.64, H 8.55, N 9.14;

Found: C 66.51, H 8.68, N 9.03.

Pre-emergence testing of this compound at a dosage of 6 pounds per acre resulted in 100% kill of mustard, flax and lettuce and 95% kill of crabgrass with moderate injury to the surviving plants. Post-emergence testing of this compound at a dosage of 6 pounds per acre resulted in 100% kill of mustard, flax and lettuce and 90 and 70% kill of carrots and crabgrass, respectively, with moderate injury to the surviving plants.

EXAMPLE 54

This example relates to m-(2,2-dimethylvaleramido)-phenyl tert-butylcarbamate. Following the procedure described in Example 18, 3'-hydroxy-2,2-dimethylvaleranilide was reacted with tert-butyl isocyanate and triethylenediamine to yield m-(2,2-dimethylvaleramido)phenyl tert-butylcarbamate melting at 124°–5° on recrystallization from aqueous ethanol.

Pre-emergence testing of this compound at a dosage of 6 pounds per acre resulted in a 100% kill of mustard, flax, lettuce and crabgrass. Post-emergence testing of this compound at a dosage of 6 pounds per acre resulted in a 100% kill of mustard, flax and lettuce and an 80% kill of crabgrass with moderate injury to the surviving plants.

EXAMPLE 55

This examples relates to m-(2-methylhexanamido)-phenyl methylcarbamate. The intermediate 3'-hydroxy-2-methylhexananilide was prepared by reaction of 2-methylhexanoyl chloride and m-aminophenol using the procedure of Example 1. Following the procedure described in Example 7, 3'-hydroxy-2-methylhexananilide was reacted with methyl isocyanate and triethylamine to yield m-(2-methylhexanamido)-phenyl methylcarbamate melting at 159°–60° on recrystallization from ethanol.

Pre-emergence testing of this compound at a dosage of 6 pounds per acre resulted in a 100% kill of mustard and flax and 95% kill of lettuce with severe injury to surviving plants and 95% kill of crabgrass with moderate damage to the surviving plants. Post-emergence testing of this compound at a dosage of 6 pounds per acre resulted in 95% kill of lettuce and flax with severe damage to the surviving plants and 95% kill of mustard with moderate injury to surviving plants; barnyard grass and carrots were moderately damaged.

EXAMPLE 56

This example relates to m-(3-methyl-2-butenamido)phenyl methylcarbamate. The intermediate 3'-hydroxy-3-methyl-2-butenanilide (m.p. 156°–7°) was prepared from m-aminophenol and 3-methyl-2-butenoyl chloride following the procedure described in Example 1 for the preparation of 3'-hydroxy-2-methylvaleranilide. Following the procedure described in Example 7, 3'hydroxy-3-methyl-2-butenanilide was reacted with methyl isocyanate and triethylamine to yield m-(3-methyl-2-butenamido) phenyl methylcarbamate melting at 168°–172° on recrystallization from aqueous ethanol.

Pre-emergence testing of this compound at a dosage of 6 pounds per acre resulted in 100% kill of flax, 95% kill of mustard with moderate damage to the surviving plants, 95% kill of lettuce with severe injury to the surviving plants and 60% kill of crabgrass with moderate damage to surviving plants. Post-emergence testing of this compound at a dosage of 6 pounds per acre resulted in 100% kill of mustard, lettuce, flax and carrots and 90% kill of crabgrass with moderate injury to the surviving plants.

EXAMPLE 57

This example relates to m-acrylamidophenyl methylcarbamate. The intermediate 3'-hydroxyacrylanilide (m.p. 164°–5°) was prepared from m-aminophenol and acryloyl chloride preparation of 3'-hydroxy-2-methylvaleranilide. Following the procedure described in Example 7, 3'-hydroxyacrylanilide was reacted with methyl isocyanate and triethylamine to yield m-acrylamidophenyl methylcarbamate, melting at 177°–8° on recrystallization from ethanol.

Pre-emergence testing of this compound at a dosage of 6 pounds per acre resulted in 100% kill of mustard, flax and lettuce, 80% kill of German hay millet and severe injury to surviving plants, and severe damage to crabgrass. Postemergence testing of this compound at a dosage of 6 pounds per acre resulted in 100% kill of mustard, lettuce, German hay millet, crabgrass and flax.

EXAMPLE 58

This example relates to m-acrylamidophenyl ethylcarbamate. Following the procedure described in Example 7, 3'-hydroxyacrylanilide was reacted with ethyl isocyanate and triethylamine to yield m-acrylamidophenyl ethylcarbamate melting at 164°–5° on recrystallization from aqueous ethanol.

Pre-emergence testing of this compound at a dosage of 6 pounds per acre resulted in 100% kill of mustard, lettuce and crabgrass, 95% of German hay millet with the remaining plants of barnyard grass. Post-emergence testing of this compound at a dosage of 6 pounds per acre resulted in 100% kill of mustard and lettuce, and slight to moderate damage to German hay millet, crabgrass, barnyard grass and flax.

EXAMPLE 59

This example relates to m-acrylamidophenyl isopropylcarbamate. Following the procedure described in Example 7, 3'- hydroxyacrylanilide was reacted with isopropyl isocyanate and triethylamine to yield m-acrylamidophenyl isopropylcarbamate melting at 200°–1° on recrystallization from ethanol.

Pre-emergence testing of this compound at a dosage of 6 pounds per acre resulted in 100% kill of lettuce, 80% kill of mustard with moderate injury to the surviving plants and moderate control of German hay millet, crabgrass and flax. Post-emergence testing of this compound at a dosage of 6 pounds per acre resulted in 100% kill of lettuce, moderate damage to flax and mustard, and only slight damage to German hay millet, crabgrass and barnyard grass.

EXAMPLE 60

This example relates to m-acrylamidophenyl tert-butylcarbamate. Following the procedure described in Example 18, 3'-hydroxyacrylanilide was reacted with tertbutyl isocyanate and triethylenediamine to yield m-acrylamidophenyl tertbutylcarbamate melting at 204°–5° on recrystallization from ethanol.

Pre-emergence testing of this compound at a dosage of 6 pounds per acre resulted in 100% kill of lettuce, 90% kill of flax, 50% kill of mustard with remaining plants expected to die, and moderate control of crabgrass and German hay millet; barnyard grass was moderately damaged. Post-emergence testing of this compound at a dosage of 6 pounds per acre resulted in 100% kill of lettuce, 75% kill of flax with the remaining plants expected to die and moderate damage to mustard, barnyard grass, German hay millet and crabgrass.

EXAMPLE 61

This example relates to m-(cyclopropylcarbonylamino)phenyl methylcarbamate. the intermediate 3'-hydroxy(cyclopropyl)carboxanilide (m.p. 182°–3°) was prepared from m-aminophenol and cyclopropylcarbonyl chloride following the procedure described in Example 1. Following the procedure described in Example 7, 3'-hydroxy(cyclopropyl)carboxyanilide was reacted with methyl isocyanate and triethylamine to yield m-(cyclopropylcarbonylamino) phenyl methylcarbamate melting at 191°–2° on recrystallization from methanol.

Pre-emergence testing of this compound at a dosage of 6 pounds per acre resulted in 100% kill of mustard, lettuce, German hay millet, crabgrass, barnyard grass and flax. Post-emergence testing of this compound at a dosage of 6 pounds per acre resulted in 100% kill of lettuce, flax and mustard, 90% kill of crabgrass with moderate injury to the surviving plants and 75% kill of barnyard grass with the remaining plants not expected to live; German hay millet was so damaged that it was not expected that the plants would live.

EXAMPLE 62

This example relates to m-(2-methylpropionamido)phenyl dimethylcarbamate. The intermediate m-aminophenyl dimethylcarbamate was prepared as follows: m-nitrophenol (100 g) was added gradually to a mixture of sodium methoxide (38.8 g) and methanol: the mixture was then heated at 60° for 2 hours and the methanol evaporated to obtain 120.9 g of the sodium salt of m-nitrophenol. Dimethylcarbamoyl chloride (79.0 g) was added dropwise to a suspension of the sodium salt of m-nitrophenol (120 g) in dioxane (600 cc). The reaction mixture was heated at 60°–5° for two hours and allowed to stir at room temperature overnight. The mixture was diluted with several volumes of water and the oil was washed several times with $H_2O$ to obtain 110.5 g of m-nitrophenyl dimethylcarbamate melting at 55°–7°. This carbamate was dissolved in ethyl acetate (150 cc), 1 g of platinum oxide was added and the mixture reduced on a Parr Hydrogenator until hydrogen absorption ceased. The platinum oxide was removed by filtration and ethyl acetate was evaporated under reduced pressure to yield 3-aminophenyl dimethylcarbamate which melted at 89°–90.5°.

Isobutyryl chloride (9.0 g) was added to a solution of m-aminophenyl dimethylcarbamate (15.0 g) and triethylamine (8.6 g) in 125 ml of benzene maintained at 60°. The solution was stirred for 3 hours at 60°, then cooled and filtered. The filtrate was cooled to 6° and washed with 10% hydrochloric acid and water. The organic layer was dried over magnesium sulfate, and the solvent was removed in vacuo to give 16.4 g of a cream colored solid. Recrystallization from benzenehexane gave 14.2 g of m-(2-methylpropionamido)phenyl dimethylcarbamate, m.p. 119°–120°.

Analysis: Calc'd for $C_{13}H_{18}N_2O_3$: C 62.38, H 7.25, N 11.19;

Found: C 62.67, H 7.45, N 11.15.

Pre-emergence testing of this compound at a dosage of 6 pounds per acre resulted in 100% kill of mustard, 90 and 95% kill of German hay millet, crabgrass and flax, respectively, with moderate damage to the surviving plants; barnyard grass and lettuce were moderately damaged. Post-emergence testing of this compound at a dosage of 6 pounds per acre resulted in 100% kill of lettuce and mustard, 80% kill of flax with the remaining plants expected to die; German hay millet, crabgrass and barnyard grass were moderately damaged.

Other examples of compounds falling within the generic formulas presented herein, which may be formulated into herbicidal compositions and applied as herein illustrated are:

m-(2-Methylhexanamido)phenyl methylcarbamate
m-(2,2,4-Trimethylvaleramido)phenyl methylcarbamate m-2-Pentenamidophenyl methylcarbamate
m-Propiolamidophenyl methylcarbamate
m-(2-Methylvaleramido)phenyl diethylcarbamate
m-Methacrylamidophenyl isopropylcarbamate
m-Methacrylamidophenyl tert-butylcarbamate
m-Cyclohexanecarboxamidophenyl methylcarbamate
m-(4-Methylvaleramido)phenyl methylcarbamate
m-Propionamidophenyl 2-buten-1-ylcarbamate
m-Propionamidophenyl methyl tert-butylcarbamate
m-Propionamidophenyl 1-chloro-2-propylcarbamate
m-Butyramidophenyl isobutylcarbamate
m-Butyramidophenyl isopropylcarbamate
m-Butyramidophenyl tert-butylcarbamate
m-Butyramidophenyl 2-chloroethylcarbamate
m-Butyamidophenyl diethylcarbamate
m-Butyramidophenyl methyl tert-butylcarbamate
m-Isobutyramidophenyl ethylcarbamate
m-Isobutyramidophenyl 2-chloroethylcarbamate
m-Isobutyramidophenyl 2-buten-1-yl carbamate
m-Isobutyramidophenyl diethylcarbamate
m-Valeramidophenyl propylcarbamate
m-Valeramidophenyl tert-butylcarbamate
m-Valeramidophenyl 2-chloroethylcarbamate
m-(2-Methylbutyramido)phenyl propylcarbamate
m-(2-Methylbutyramido)phenyl butylcarbamate
m-(2-Methylbutyramido)phenyl tert-butylcarbamate
m-(Cyclopropylcarbonylamino)phenyl 2-chloroethylcarbamate
m-(Cyclopropylcarbonylamino)phenyl 2-buten-1-yl carbamate
m-(Cyclopropylcarbonylamino)phenyl methyl tert-butylcarbamate
m-(Cyclopropylcarbonylamino)phenyl 1-chloro-2-propylcarbamate
m-(2-Methylvaleramido)phenyl 2-chloroethylcarbamate
m-(2-Methylvaleramido)phenyl 2-buten-1-yl carbamate
m-(2-Methylvaleramido)phenyl 1-chloro-2-propylcarbamate
m-Pivalamidophenyl tert-butylcarbamate
m-Crotonamidophenyl 2-chloroethylcarbamate
m-Crotonamidophenyl diethylcarbamate
m-Crotonamidophenyl 1-chloro-2-propylcarbamate
m-(2-Chloropropionamido)phenyl ethylcarbamate
m-(2-Chloropropionamido)phenyl isopropylcarbamate
m-(2-Chloropropionamido)phenyl tert-butylcarbamate
m-(2-Chloropropionamido)phenyl isopentylcarbamate
m-(2-Chloropropionamido)phenyl 2-chloroethylcarbamate
m-(2-Chloropropionamido)phenyl 2-buten-1-yl carbamate
m-(2-Chloropropionamido)phenyl diethylcarbamate
m-(2,2-Dimethylvaleramido)phenyl sec-pentylcarbamate
m-(2,2-Dimethylvaleramido)phenyl 2-chloroethylcarbamate
m-(2,2-Dimethylvaleramido)phenyl 2-buten-1-yl carbamate
m-(2,2-Dimethylvaleramido)phenyl dimethylcarbamate m-Methacrylamidophenyl isopropylcarbamate
m-Methacrylamidophenyl tert-butylcarbamate
m-Methyacrylamidophenyl 2,2-dimethylpropylcarbamate
m-Methacrylamidophenyl allylcarbamate
m-Methacrylamidophenyl 2chloroethylcarbamate
m-Methacrylamidophenyl diethylcarbamate
m-(2-Methyl-2-pentenamido)phenyl isopropylcarbamate
m-(2-Methyl-2-pentenamido)phenyl tert-butylcarbamate
m-(2-Methyl-2-pentenamido)phenyl allylcarbamate
m-(2-Methyl-2-pentenamido)phenyl 2-chloroethylcarbamate
m-(2-Methyl-2-pentenamido)phenyl 2-buten-1-yl carbamate
m-(2-Methyl-2-pentenamido)phenyl dimethylcarbamate
m-Acetamidophenyl isopropylcarbamate
m-Acetamidophenyl tert-butylcarbamate
m-Acetamidophenyl hexylcarbamate
m-Acetamidophenyl 2-chloroethylcarbamate
m-Acetamidophenyl dimethylcarbamate
m-Hexanamidophenyl isopropylcarbamate
m-Hexanamidophenyl tert-butylcarbamate
m-Hexanamidophenyl 2-chloroethylcarbamate
m-Hexanamidophenyl diethylcarbamate
m-(2,2-Dimethylbutyramido)phenyl isopropylcarbamate
m-(2,2-Dimethylbutyramido)phenyl tert-butylcarbamate
m-(2,2-Dimethylbutyramido)phenyl 2-chloroethylcarbamate
m-(2-Methylcrotonamido)phenyl isopropylcarbamate
m-(2-Methylcrotonamido)phenyl tert-butylcarbamate
m-(2-Methylcrotonamido)phenyl 2-chloroethylcarbamate
m-(2-Chloro-2-methylvaleramido)phenyl isopropylcarbamate
m-(2-Chloro-2-methylvaleramido)phenyl tert-butylcarbamate
m-(2-Chloro-2-methylvaleramido)phenyl 2-chloroethylcarbamate
m-(2-Chloro-2-methylvaleramido)phenyl diethylcarbamate
m-(2-Chlorovaleramido)phenyl isopropylcarbamate
m-(2-Chlorovaleramido)phenyl tert-butylcarbamate
m-(2-Chlorovaleramido)phenyl 2-chloroethylcarbamate
m-(2-Methylhexanamido)phenyl isopropylcarbamate
m-(2-Methylhexanamido)phenyl diethylcarbamate
m-2-Methylhexanamido)phenyl tert-butylcarbamate
m-(2-Methylhexanamido)phenyl 2-chloroethylcarbamate
m-(3,3-Dimethylacrylamido)phenyl ethylcarbamate
m-(3,3-Dimethylacrylamido)phenyl dimethylcarbamate
m-(3,3-Dimethylacrylamido)phenyl isopropylcarbamate
m-(3,3-Dimethylacrylamido)phenyl tert-butylcarbamate
m-(3,3-Dimethylacrylamido)phenyl 2-chloroethylcarbamate
m-Acrylamidophenyl dimethylcarbamate
m-Acrylamidophenyl 2-chloroethylcarbamate
m-(2-Chlorobutyramido)phenyl methylcarbamate
m-(2-Chlorobutyramido)phenyl tert-butylcarbamate
m-(2-Chlorobutyramido)phenyl dimethylcarbamate
m-(2-Chlorobutyamido)phenyl dimethylcarbamate
m-(2-Chloro-2-methylpropionamido)phenyl methylcarbamate
m-(2-Chloro-2-methylpropionamido)phenyl ethylcarbamate
m-(2-Chloro-2-methylpropionamido)phenyl isopropylcarbamate
m-(2-Chloro-2-methylpropionamido)phenyl tert-butylcarbamate
m-(2-Chloro-2-methylpropionamido)phenyl 2-chloroethylcarbamate
m-(3-Methylbutyramido)phenyl methylcarbamate
m-(3-Methylbutyramido)phenyl diethylcarbamate
m-(3-Methylbutyramido)phenyl tert-butylcarbamate
m-(3-Methylbutyramido)phenyl 2-chloroethylcarbamate
m-(2,2-Diethylacetamido)phenyl methylcarbamate
m-(2,2-Diethylacetamido)phenyl isopropylcarbamate
m-(2,2-Diethylacetamido)phenyl tert-butylcarbamate
m-(2,2-diethylacetamido)phenyl 2-chloroethylcarbamate
m-Heptanamidophenyl methylcarbamate
m-Heptanamidophenyl tert-butylcarbamate
m-(2-pentenamido)phenyl tert-butylcarbamate It is clear that the classes of m-amidophenyl carbamates described and illustrated herein are characterized by herbicidal activity, and that the degree of this activity varies among specific compounds within these classes and to some extent among the species of plant to which these compounds may be applied. Thus, selection of a specific herbicidal compound to control undesirable plant species without injury to a desired crop species may readily be made.

Especially good results have been attained by the use of m-propionamidophenyl 2-chloroethylcarbamate as a postemergence herbicide for use in controlling weed grasses (barnyard grass, crabgrass) and broad-leaved weeds (mustard, lambsquartes, pigweed and chickweed) in legumes (alfalfa, clover, lespedeza, etc.) at a dosage of, for example, one pound per acre.

The active herbicidal compounds of this invention may be formulated and/or applied with insecticides, fungicides, nematocides, plant growth regulators, fertilizers, and other agricultural chemicals and may be used as effective soil sterilants as well as in herbicidal applications. In applying an active compound of this invention, whether formulated alone or with other agricultural chemicals, an effective amount and concentration of the m-amidophenyl N-substituted-carbamate is of course employed.

It is apparent that various modifications may be made in the formulation and application of the novel compounds of this invention, without departing from the inventive concepts herein, as defined in the following claims:

We claim:

1. Herbicidal compositions comprising as an essential active ingredient an effective herbicidal amount of a herbicidal compound of the formula

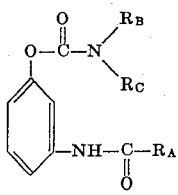

where $R_C$ is a hydrogen or lower alkyl and $R_A$ and $R_B$ are selected from the group consisting of cycloalkyl of 3 to 6 carbon atoms and aliphatic hydrocarbon containing up to about 6 catenated carbon atoms which may be substituted with chlorine or lower alkyl groups and a compatible carrier therefor.

2. Herbicidal compositions as in claim 1 in which $R_A$ and $R_B$ are each an aliphatic hydrocarbon radical of up to about 6 catenated carbon atoms.

3. Herbicidal compositions as in claim 1 in which $R_C$ is hydrogen or methyl.

4. Herbicidal compositions as in claim 3 in which

is the residue of a carboxylic acid in which the alpha carbon carries a methyl group.

5. Herbicidal compositions as in claim 3 in which

is the residue of a carboxylic acid in which the alpha carbon is part of a cyclopropyl ring.

6. Herbicidal compositions as in claim 3 in which $R_A$ is alkenyl.

7. Herbicidal compositions as in claim 3 in which $R_A$ is a 1-propenyl radical.

8. Herbicidal compositions as in claim 3 in which $R_A$ is ethyl.

9. Herbicidal compositions as in claim 3 in which $R_A$ is 2-methybutyl.

10. Herbicidal compositions as in claim 3 in which $R_C$ is hydrogen, $R_A$ is hydrogen, $R_B$ is t-butyl.

11. Herbicidal compositions as in claim 8 in which $R_C$ is hydrogen and $R_B$ is isopropyl.

12. Herbicidal compositions as in claim 8 in which $R_C$ is hydrogen and $R_B$ is sec-butyl.

13. Herbicidal compositions as in claim 8 in which $R_C$ is hydrogen and $R_B$ is 2-chloroethyl.

14. Herbicidal compositions as in claim 8 in which $R_C$ is hydrogen and $R_B$ is ethyl.

15. Herbicidal compositions as in claim 8 in which $R_C$ is hydrogen and $R_B$ is propyl.

16. Herbicidal compositions as in claim 3 in which $R_C$ is hydrogen, $R_A$ is 1-methyl propyl and $R_B$ is methyl.

17. Herbicidal compositions as in claim 3 in which $R_C$ is hydrogen, $R_A$ is 1-methylbutyl and $R_B$ is methyl.

18. Herbicidal compositions as in claim 3 in which $R_C$ is hydrogen, $R_A$ is tert-butyl and $R_B$ is methyl.

19. Herbicidal compositions as in claim 3 in which $R_C$ is hydrogen, $R_A$ is 1-methylbutyl and $R_B$ is tert-butyl.

20. Herbicidal compositions as in claim 3 in which $R_C$ is hydrogen, $R_A$ is 1-methylbutyl and $R_B$ is isopropyl.

21. Herbicidal compositions as in claim 3 in which $R_C$ is hydrogen, $R_A$ is isopropenyl and $R_B$ is methyl.

22. Herbicidal compositions as in claim 3 in which $R_C$ is hydrogen, $R_A$ is 1-methyl-1-butenyl and $R_B$ is methyl.

23. Herbicidal compositions as in claim 3 in which $R_B$ is chloroethyl.

24. Method of controlling undesired plant growth which comprises applying to the locus where control is desired a herbicidal amount of a herbicidal compound of the formula

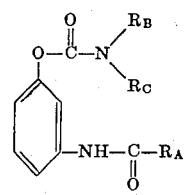

where $R_C$ is hydrogen or lower alkyl and $R_A$ and $R_B$ are selected from the group consisting of cycloalkyl of 3 to 6 carbon atoms and aliphatic hydrocarbon containing up to about 6 catenated carbon atoms which may be substituted with chlorine or lower alkyl groups.

25. Method as in claim 24 in which $R_A$ and $R_B$ are each an aliphatic radical.

26. Method as in claim 25 in which $R_A$ and $R_B$ are each an aliphatic hydrocarbon radical of up to about 6 catenated carbon atoms.

27. Method as in claim 26 in which $R_C$ is hydrogen or methyl and

is the residue of a carboxylic acid in which the alpha carbon carries a methyl group.

28. Method as in claim 26 in which $R_C$ is hydrogen or methyl and

is the residue of a carboxylic acid in which the alpha carbon carries a methyl group.

29. Method as in claim 26 in which $R_C$ is hydrogen or methyl and $R_A$ is ethyl.

30. Method as in claim 29 in which $R_C$ is hydrogen and $R_B$ is chloroethyl.

31. Method as in claim 26 in which $R_C$ is hydrogen or methyl and $R_B$ is chloroethyl.

* * * * *

UNITED STATES PATENT OFFICE
CERTIFICATE OF CORRECTION

PATENT NO. : 3,857,693
DATED : December 31, 1974
INVENTOR(S) : Kenneth L. Hill and Kenneth R. Wilson It is certified that error appears in the above—identified patent and that said Letters Patent are hereby corrected as shown below:

Column 1, line 48, "hyxyl" should read "hexyl".
Column 4, line 39, "taxicant" should read "toxicant".
Column 8, line 47, for "phenylisopropylcarbamate" read "phenyl isopropylcarbamate".
Column 8, line 48, insert the word "the" after "ing".
Column 10, line 22, "bannyard" should read "barnyard".
Column 21, line 19, "5x105 mm, Hg." should read "5x10-5 mm, Hg."
Column 24, line 20, after "remaining plants" insert "not expected to survive, 90% kill of flax and moderate control".
Column 25, line 2, "yanilide" should read "anilide".
Column 25, line 55, after "mustard," insert "95%".
Column 29, claim 10, should read:
 "Herbicidal compositions as in claim 3 in which $R_C$ is hydrogen, $R_A$ is cyclopropyl and $R_B$ is t-butyl."

Signed and Sealed this

Sixth Day of July 1976

[SEAL]

Attest:

RUTH C. MASON
*Attesting Officer*

C. MARSHALL DANN
*Commissioner of Patents and Trademarks*